Feb. 16, 1937.　　　L. WILLEME　　　2,070,702
ROAD OR RAILWAY VEHICLE
Filed Jan. 5, 1933
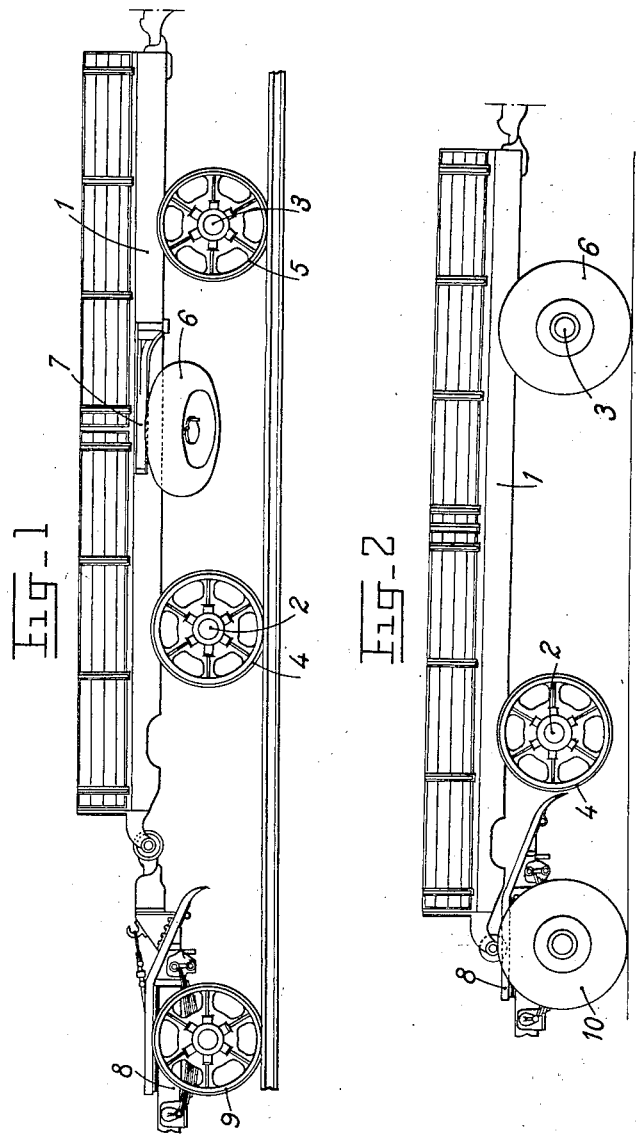
L. Willeme
Inventor
By: Glascock Downing & Seebold
Attys.

Patented Feb. 16, 1937

2,070,702

UNITED STATES PATENT OFFICE 2,070,702

ROAD OR RAILWAY VEHICLE

Louis Willeme, Nanterre, France, assignor to Societe Anonyme Etablissements Willeme, Nanterre, France, a corporation of France Application January 5, 1933, Serial No. 650,336
In France September 29, 1932

1 Claim. (Cl. 105—215)

The invention relates to a wagon, platform or trailer adapted to run, as desired, on railways and on roads.

The construction of wagon according to the invention enables it to be included among the vehicles of goods' trains, or to be unhooked and coupled to a tractor of any type for running on roads. The said wagon, platform or trailer is supported by two axles, one of which may simply be provided at its ends with ordinary metal wheels for running on the railway, while the other is provided with mixed wheels, comprising a rim for running on rails and a readily detachable pneumatic tyre. It will be appreciated that, as a consequence of this arrangement, when the wagon, platform or trailer is running on railway tracks, it will rest on the rails by its metal tyres, whilst, when it is desired to run the wagon on a road, it is merely necessary to couple it by means of any suitable device to the rear of a tractor, the axle placed at the same end as the coupling being raised, so that the wagon is able to leave the rails and rest solely on the pneumatic tyres.

For a better understanding of the invention, a constructional form will be described more fully by way of example with reference to the accompanying drawing, in which:

Figure 1 is a view of a platform in running order for travelling on railway tracks.

Figure 2 is a similar view to Figure 1, showing the platform in running order for travelling on roads.

The frame of the wagon, platform or trailer is indicated at 1 and rests on two axles 2 and 3. One of the said axles, which may be called the front axle 2, carries at its ends ordinary metal wheels 4 for running on railway tracks. The second axle or back axle 3 is likewise provided with metal wheels 5 adapted to carry pneumatic tyres 6 which, when the frame 1 is running on a railway track, are hooked up at 7. When the wagon 1 is running on railway tracks, it rests solely on the rails by the metal tyres 4 and 5, and may be either included among the vehicles of a goods' train, or coupled to any tractor 8, the metal wheels 9 of which are adapted to run on railway tracks or to carry pneumatic tyres for running on roads. On the contrary, when the frame 1 is to run on roads, it is coupled to the tractor 8, the front axle 2 being slightly raised in the known manner so as to detach its wheels 4 from the base which they are resting on. The tractor is then provided with pneumatic tyres, and the tyres 6 are unhooked from the frame 1 in order to mount them on the wheels 5. In this way, the platform or wagon is able to leave the rails and rest on the ground solely by the pneumatic tyres 6.

It is evident that it is possible to construct a wagon or platform adapted to be coupled at the front or at the rear to a tractor, in which case the axles 2 and 3 each comprise on their ends metal tyres and detachable pneumatic tyres. In this case, its four wheels may be employed, if desired, for running on roads.

It is understood of course that the invention is not limited to any of the particular constructional details described in the foregoing. The tractor may be of any type, provided it comprises a coupling device allowing the axle of the trailer nearest the coupling point to be raised. As to the wagon, platform or the like, intended for mixed traction on rails or on roads, it will be provided, on at least one of its axles with any type of mixed wheels, comprising metal rims for the railway track and pneumatic tyres for the road, the whole being combined with means for coupling it to an automobile tractor.

I claim:

A road and railway vehicle comprising a frame, two axles similarly disposed at opposite ends of the frame for supporting said frame, identical railway-wheels at the ends of each axle, road-wheels adapted to be detachably clamped on the railway-wheels on one of the axles, said road wheels having a greater diameter than said railway-wheels and means for coupling the vehicle to a road tractor including means for raising the end of the vehicle opposite the road-wheels a distance substantially equal to the difference in radius between the road and rail wheels whereby the vehicle will be substantially level when either the road-wheels are in use or when the railway-wheels are in use.

LOUIS WILLEME.